Aug. 20, 1968 — E. A. OSTRANDER ET AL — 3,397,838
COMPARATIVE VALUE DEVICE
Filed March 10, 1967 — 2 Sheets-Sheet 1
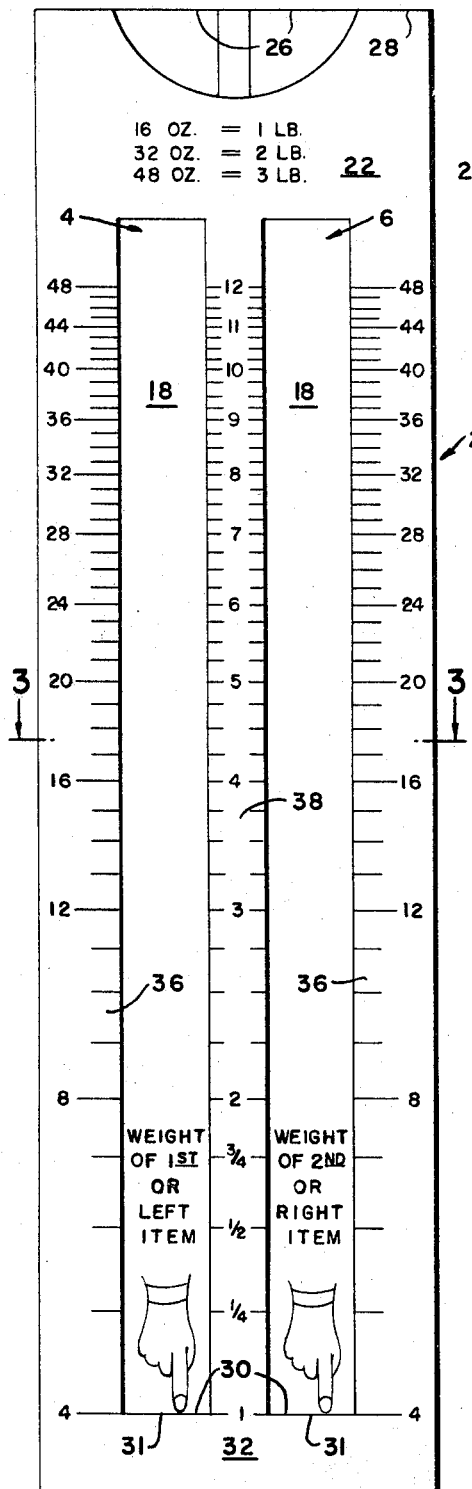
FIG.1. FIG.2. FIG.3. FIG.4.
INVENTORS
Edgar A. Ostrander &
Frederick C. Velsor, Jr.
BY 
ATTORNEY INVENTORS
Edgar A. Ostrander &
Frederick C. Velsor, Jr.

BY Clive H. Bramson

ATTORNEY

United States Patent Office 3,397,838
Patented Aug. 20, 1968

3,397,838
COMPARATIVE VALUE DEVICE
Edgar A. Ostrander, 50 6th St., Lake Ronkonkoma, N.Y. 11779, and Frederick C. Velsor, Jr., 33 Coates Ave., Holbrook, N.Y. 11741
Filed Mar. 10, 1967, Ser. No. 622,339
9 Claims. (Cl. 235—70)

ABSTRACT OF THE DISCLOSURE

A slide rule-type device including a pair of slide members carrying identical price logarithm scales on one side and a fixed member for slidably supporting the slide members. The fixed member has a logarithmic divided scale of quantity on the side other than the one displaying the price logarithm scales of the slide members. The fixed member further has stop means at one end thereof to preclude movement of the slides beyond said one end.

---

This invention relates generally to shopping guide or comparison devices and more particularly to a device which enables rapid determination of the better valued of first and second comparable items whereby the user is not called upon to either interpret or remember any intermediate numerical figures.

Whereas, the shopper is often confused and misled by the varying weights or volumes contained in packages marked with different prices, the present invention is primarily provided to automatically indicate to the shopper the item having the lowest cost per unit quantity, such indication being an abstract visual determination rather than a numerical one. Thus, e.g., where first and second comparable items are marked 92¢/3 lbs., and 67¢/2¼ lbs., respectively, it will be readily seen that the average shopper would find difficulty in computing that the second item is a better value at 29¢/lb., inasmuch as the first item is 30.7¢/lb.

Accordingly, and consonant with the foregoing, the instant invention has for an object the provision of a slide rule-type device which will allow an average shopper, such as a housewife, to determine the "best buy" between two items without having to read or remember any intermediary values, without requiring numerical interpretation of the final result, and without requiring the setting of coincidence between two variable positions on two scales.

Another object of the present invention is to provide a device of the foregoing character having two sides, all scales in view on one side referring only to quantity, e.g., weight, and only cost concerning the scales on the other side.

A further object of this invention resides in the provision of a comparative value device having logarithmic scales on both sides thereof, including two slides, and a common stop at one end of said device, movement of said slides and their physical relation with respect to said common stop being determinative of the item of greater value.

Another general object of the present invention is to provide a device of the described character which will be simple in structure, economical of manufacture and highly effective in use.

Other objects and advantages of the instant comparative value device will be set forth in part hereinafter and in part will be obvious herefrom, or may be learned by practice of the invention, the same being realized and attained by means of the structure defined and pointed out in the appended claims.

The accompanying drawings referred to herein and constituting a part hereof, illustrate one embodiment of the invention, and together with the description, serve to explain the principles of the invention.

FIGURE 1 is a plan view of the obverse side of the device, the slide members thereof being disposed in edge-abutting relation with one end of the device;

FIGURE 2 is a fragmentary plan view of the obverse side of the device illustrating the slide members set in relative weight-indicating positions;

FIGURE 3 is an elevational cross-sectional view taken along line 3—3 of FIGURE 1;

FIGURE 4 is an elevational view of a longitudinal edge of the device;

Figure 5:
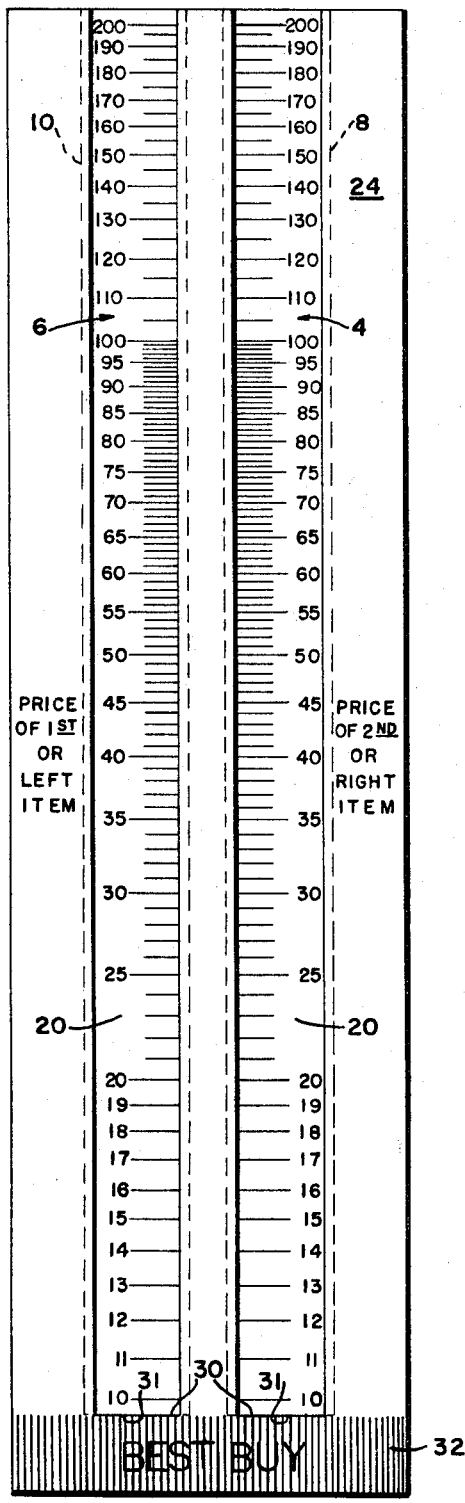
FIGURE 5 is a plan view of the reverse side of the device in the position shown in FIGURE 1.

Referring now in detail to the present preferred embodiment of the invention illustrated in the accompanying drawings, FIGURES 1–6 show the comparative value device which includes a fixed body member designated generally by numeral 2 and a pair of first and second parallel slides designated generally by numerals 4 and 6, respectively, said slides being movably secured within longitudinal slide-receiving channels 8 and 10 disposed between spacing divider 12 and longitudinal border portions 14 and 16 of said fixed body member.

As will be observed by referring to FIGURE 3, numerals 18 and 20, respectively, designate the obverse and reverse sides of said slides, the numerals 22 and 24 being designative, respectively, of the obverse and reverse sides of said fixed body member 22.

The obverse sides of said slides will be seen in FIGURE 1 of the drawings, the upper ends 26 of said slides being shown flush with the upper end 28 of said body member, the lower ends 30 thereof being shown abutting wall 31 of stop member 32 which extends across the lower end 34 of said body member thereby precluding movement of said slides therebeyond.

Obverse surfaces 18 of slides 4 and 6 are respectively marked, as shown, to indicate that the lower ends 30 thereof are indicative of the quantity, e.g., the weight of the first and second items being compared, said lower ends being coacting with respective logarithmically-divided scales 36 of quantity provided along said border portions of the body member as shown. Said scales are identical and were produced in the present embodiment by plotting with the 50 scale, the logarithms multiplied by 3. A central logarithmic scale of quantity 38 is also provided to accommodate smaller weight per item values, e.g., item weights within the range of ¼–4 lbs., without unduly extending the length of the instant device.

Figure 6:
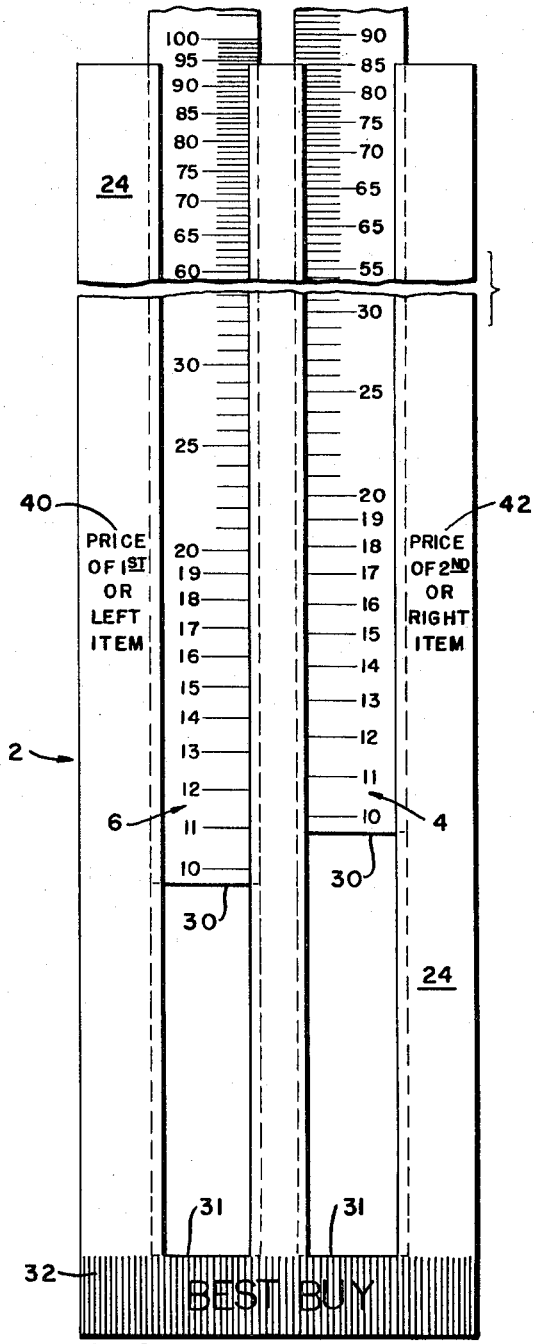
FIGURE 6 is a view of the reverse side of the device in the position shown in FIGURE 2.

In FIGURES 5 and 6 wherein the aforementioned reverse sides of the device are shown, said slide members will be observed to carry identical logarithmically-divided scales of price, which as in the case of the aforedescribed fixed body member scales, have been similarly derived by plotting with the 50 scale, the logarithms multiplied by 3.

The aforesaid stop means 32, as shown in FIGURES 5 and 6 is colored red and is further inscribed with the words "Best Buy" to facilitate visual comparison of the distance between said stop means and selected comparative price values on the scales of the respective reverse sides of said slides, the shortest distance therebetween, as will be described hereinbelow, indicative of whether the first or second item is the better value.

With further reference to FIGURES 5 and 6, the reverse sides of border portions 14 and 16 of said body member will be seen to carry first and second item-distinguishing indicia 40 and 42 adjacent respective slides.

Having described the structural details of the present invention, the mathematical considerations of conventional value shopping shall now be discussed, whereafter the mode of operation of the present device in relation to the well-known practices shall be described.

In deciding upon the "best buy" between two items for sale, one usually determines the cost per unit quantity (e.g., 8¢ per oz.), of each item; compare them in this respect, assuming qualities being equal; and the item having the lowest cost per unit weight, e.g., is considered the "best buy," i.e., more for the money.

Where $C_1$ and $W_1$; and $C_2$ and $W_2$ represent the costs and weight of items 1 and 2, respectively, the shopper must determine whether $C_1/W_1$ is greater or less than $C_2/W_2$, the smaller value being the better buy. This relation may be expressed as follows:

$$Is\ C_1/W_1 \gtreqless C_2/W_2 ? \qquad (1)$$

By multiplying both sides of expression (1) by $W_1W_2$, the expression transforms into.

$$Is\ C_1W_2 \gtreqless C_2W_1 ? \qquad (2)$$

the smaller quantity indicating the "best buy," identified by the subscript of the price inasmuch as $C_1$ and $C_2$ remain as originally located in expression (1).

In performing the foregoing comparison, the user would preferably hold the device in the left hand, the obverse side 18 thereof facing the user. Next, the lower ends 30 of the slides are arranged whereby hands 44 and 46 respectively coact with scales 36 to indicate the weights of the first and second items being compared, Alternatively, as hereinabove described, central scale 38 may also be utilized. Thus e.g., as shown in FIGURE 2 of the drawings, hand 44 may be considered to point to first item quantity of 10 oz. and hand 46 to a second item quantity of 9 oz. Next, the device is turned over so that the reverse side thereof faces the user. Assuming the first item to be priced at 12¢ and the second item at 11¢ it will be seen that the 12¢ marking on the left or first item slide 6 is physically closer to the words "Best Buy" on stop means 32 than the 11¢ marking on the right or second slide 4. Thus, the first item is purchased, since it is the best value of the items being compared.

In operation, what has been accomplished in the foregoing example is the multiplication of $W_1$ by $C_2$ and the multiplication of $W_2$ by $C_1$ as called for in expression (2) above. The result of $W_1 \times C_2$, e.g., will not be seen or read opposite $C_2$ as in a conventional slide rule, however the position of $C_2$ is nevertheless proportional to the product $W_1C_2$ inasmuch as it represents the addition of their logarithms. Accordingly, the visual comparison of $C_1$ and $C_2$ is, in fact, the comparison of the relative magnitudes of $W_2C_1$ and $W_1C_2$. Further, as shown in expression (2) above, since prices are the quantities examined, the association of the smallest product with the "best buy" is consistent.

Although the preferred embodiment of the comparative value device has been described, it will be understood that within the purview of this invention various changes may be made in the forms, details, proportion and arrangement of parts, the combination thereof and mode of operation, which generally stated consists in a device capable of carrying out the objects set forth, as disclosed and defined in the appended claims.

What is claimed is:

1. A quantity-cost comparison device for determining the relative value of two comparative items for sale, comprising in combination, a fixed body member and a pair of parallel slides movably associated therewith, each said slide having an upper and a lower end and an obverse and a reverse side, the latter side of each slide carrying identical scales, said body member having an obverse and a reverse side, an upper and a lower end, and a pair of parallel slide-receiving slots extending between said upper and lower ends, said obverse side of said body member carrying at least one scale, and stop means provided at said lower end of said body member to preclude movement of said lower end of each of said slides beyond said lower end of said body member.

2. A quantity-cost comparison device as set forth in claim 1 wherein said body member includes a spacing divider separating said slides.

3. A quantity-cost comparison device as set forth in claim 2 wherein said spacing divider carries said at least one scale carried by said obverse side of said body member.

4. A quantity-cost comparison device as set forth in claim 1 wherein said scales carried by the reverse sides of said respective slides are logarithmically divided scales of price.

5. A quantity-cost comparison device as set forth in claim 4 wherein said at least one scale carried by said obverse side of said body member is a logarithmically divided scale of quantity.

6. A quantity-cost comparison device as set forth in claim 5 wherein said body member includes a spacing divider separating said slides, and wherein said spacing divider carries said at least one scale carried by said obverse side of said body member.

7. A quantity-cost comparison device as set forth in claim 1 wherein the obverse sides of said slides are identified by markings indicating respectively, the quantity of the first and second items being compared and said reverse side of said body member having first and second item-distinguishing indicia adjacent said respective slides.

8. A quantity-cost comparison device as set forth in claim 1, said stop means being colored to facilitate visual comparison of the distance between said stop means and selected comparative price values on the scales of the respective reverse sides of said slides to thus determine whether the first or second item is the better value, and said stop means being extended across said lower end of said body member, said lower ends of said slides being in removable abutting relation with said stop means.

9. A quantity-cost comparison device for determining the relative value of two comparative items for sale comprising in combination, a fixed body member and a pair of parallel slides movably secured thereto, each said slide having an upper and a lower end and an obverse and a reverse side, the reverse sides of said slides being similarly faced and each reverse side carrying identical logarithmically-divided scales of price, said body member having an obverse and a reverse side, an upper and a lower end, and a pair of parallel, spaced, slide-receiving channels extending longitudinally between said upper and lower ends, said obverse side of said body member carrying a pair of identical logarithmically-divided scales of quantity, each one of said pair of scales being adjacent with respect to a respective slide and being coacting with the lower ends thereof, said lower end of said body member having stop means extending across said slide-receiving channels, the obverse sides of said slides being identified by markings indicating respectively, the quantity of the first and second items being compared and said reverse side of said body member having first and second item-distinguishing indicia adjacent said respective sldes.

(References on following page)

References Cited

UNITED STATES PATENTS

| | | | |
|---|---|---|---|
| 1,001,061 | 8/1911 | Michaelson | 235—70.1 |
| 1,602,479 | 10/1926 | Bulmer et al. | 235—70.1 |
| 2,034,027 | 3/1936 | Decary et al. | 235—70 |
| 2,595,299 | 5/1952 | Russell | 235—84 |
| 2,871,582 | 5/1959 | Frank | 235—84 |
| 3,275,235 | 9/1966 | Balch | 235—84 |

OTHER REFERENCES

What's Newest, Newsweek, vol. LVIII, No. 5, July 31, 1961.

RICHARD B. WILKINSON, *Primary Examiner.*

STANLEY A. WAL, *Assistant Examiner.*